April 15, 1941.    C. D. PETERSON    2,238,370
CHANGE-SPEED TRANSMISSION GEARING
Filed July 15, 1938    2 Sheets-Sheet 2
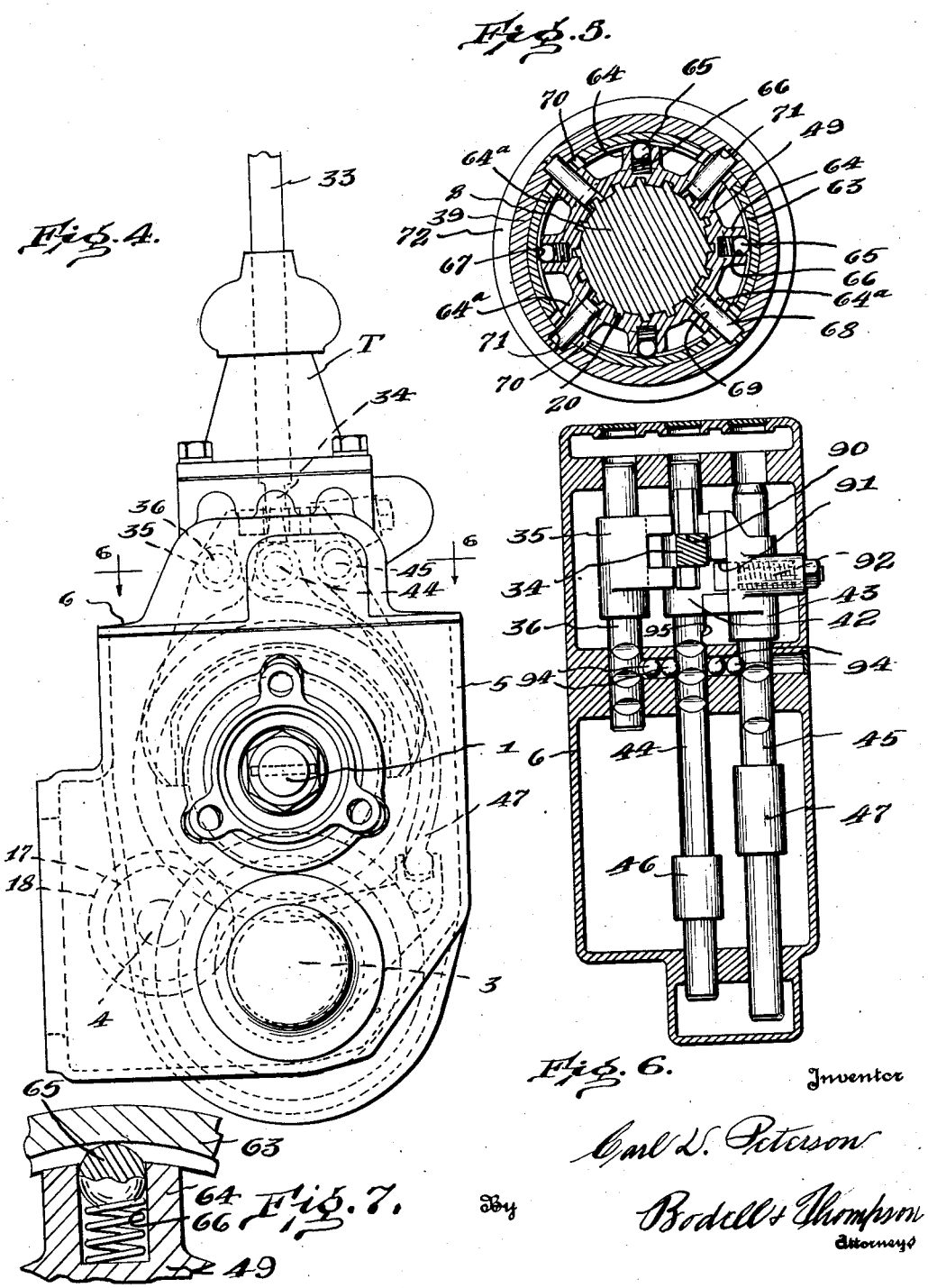

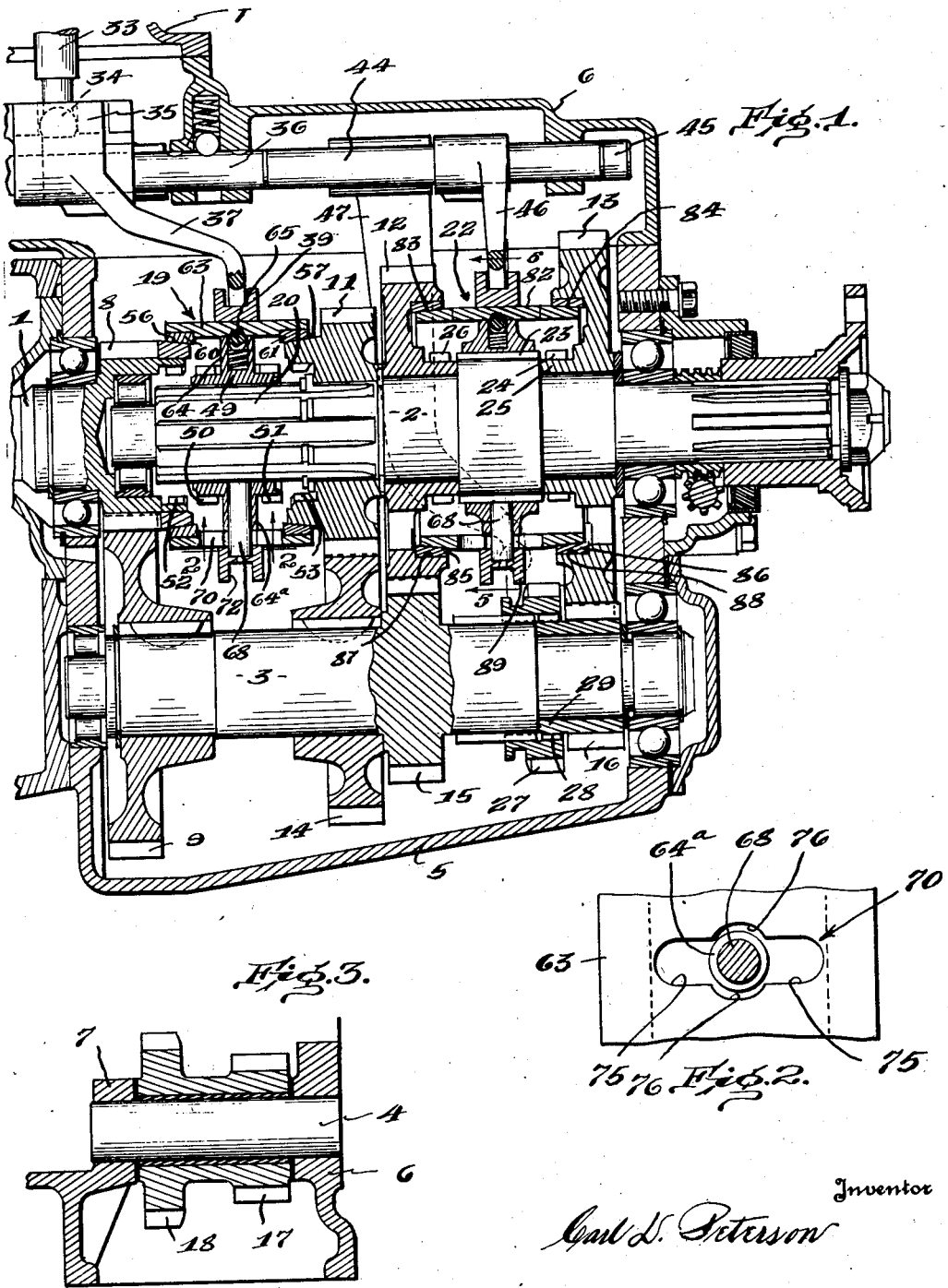

Patented Apr. 15, 1941

2,238,370

UNITED STATES PATENT OFFICE 2,238,370

CHANGE-SPEED TRANSMISSION GEARING

Carl D. Peterson, Toledo, Ohio

Application July 15, 1938, Serial No. 219,421

13 Claims. (Cl. 74—333)

This invention relates to change-speed transmission gearing of the type used in motor vehicles, and has for its object a compact synchronized gear shifting arrangement for a transmission of minimum length with transmissions heretofore used of equal capacity, as for instance, an arrangement of the reverse gearing in a multiple speed forward, as a four speed forward, transmission gearing, by which two parts, as gears out of mesh, are running synchronously before being brought into mesh, because both are idling in another gear train, as for instance, when one part is a gear of a combined clutch and gear, which is rotatable with the countershaft of the gearing and is shiftable into mesh with another part, as one gear of the reverse spool, the other gear of which spool meshes with a gear on the transmission shaft utilized normally to produce one of the indirect forward drives, as first speed forward, which gear on the transmission shaft also meshes with the gear normally clutched to the countershaft by the combined clutch and gear.

Another object is to provide in a transmission gearing, means wherein one of the speeds, as reverse speed, is controlled through a shiftable element embodying a synchronizer, primarily for effecting one of the forward speeds, when said element is shifted out of idle or neutral position and into operative position, together with means which renders the forward gear train, controlled by the shiftable element, ineffective, when the reverse speed gear element is shifted in conjunction therewith.

Another object is to provide a particularly simple and efficient mechanism for effecting the speed synchronization of the gearing in all speeds, including reverse.

Another object is an arrangement, whereby a single selecting and shifting lever is employed to produce multiple speeds forward and reverse speed, where one of the shifters utilized for one of the forward speeds is also shifted into operative or active position and utilized to effect reverse speed, that is, a single selecting and shifting lever operable to effect shifts, as the four forward speeds and reverse through one of the shiftable elements utilized in producing a forward speed.

It further has for its object a particularly simple, compact and economical construction of synchronizing clutch.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of the gearing.

Figure 2 is an enlarged fragmentary detail view, partly in section, on line 2—2, Figure 1.

Figure 3 is a fragmentary detail view of the reverse gear spool and contiguous parts.

Figure 4 is an end elevation on a reduced scale looking to the left in Figure 1.

Figure 5 is a sectional view on line 5—5, Figure 1.

Figure 6 is a horizontal sectional view taken approximately on line 6—6, Figure 4.

Figure 7 is a fragmentary enlarged sectional view through the spring-pressed ball, and contiguous parts, for yieldingly transmitting the shifting movement of the toothed clutch section to the synchronizing section.

The gearing here illustrated is of the all-in-mesh helical type and the shiftable elements for controlling the different speeds are clutches embodying synchronizers.

The invention is shown as embodied in the type of transmission gearing comprising a drive shaft 1, transmission shaft 2, a countershaft 3, and a shaft 4 on which a reverse gear spool is mounted, gearing between the shafts including shiftable elements, as synchronized clutches, and shifting mechanism including a single selecting and shifting lever, operable to select and shift the shiftable elements or clutches, with one of the shiftable elements or clutches, as the one establishing first speed forward, being shiftable from idle, normal or neutral position into operative position, and another of the shiftable elements being shiftable subsequently or in sequence therewith for producing in conjunction therewith, another speed as reverse speed, the shifting of the latter element cutting out the forward speed but leaving the former shiftable element in engaged or operative position.

The invention comprises a change-speed transmission gearing which embodies the usual gear box, drive, transmission and countershafts mounted therein, trains of all-in-mesh gears between the shafts selectable to produce a plurality of speeds forward including direct drive, and a reverse gearing including a double gear or spool, one gear of which is in mesh with one of the gears of one of the forward trains, as the gear on the transmission shaft of the first speed forward train, so that the spool normally idles in said forward train, the reverse gear train also including a unit on the countershaft and having a gear shiftable into and out of mesh with the other gear of the spool and normally out of mesh therewith, the unit also having a clutch normally clutching a gear of said forward train to the countershaft and shiftable to unclutch the same, when shifted to carry its gear into mesh with the gear of the spool, shiftable clutch elements embodying synchronizers selectively operable for selectively clutching certain gears of the trains, except the reverse train, to the shafts on which they are mounted, and means for selecting and shifting the clutches and said unit, whereby the shiftable synchronizing clutch, which clutches the gear of said forward train to the transmission shaft, also synchronizes the reverse gear spool, so that the speeds of the gear of said unit and said spool are synchronized before shifting the gear of the unit into mesh with the gear of the spool. The selecting and shifting means also includes mechanism for shifting the unit out of its normal position only when the gear of the first speed train is clutched by its synchronizing clutch to the transmission shaft and permitting selecting and shifting of said synchronizing clutch only when the unit is being shifted back to its normal position.

The shafts 1, 2, 3 and 4 are suitably mounted in a gear box 5 having a removable cover 6 in which the selecting and shifting mechanism is mounted. The driving and transmission shafts 1 and 2 are mounted in the usual manner in axial alinement in bearings mounted in the front and rear walls of the gear box. The countershaft 3 is also mounted in bearings in the front and rear walls of the gear box, while the reverse gear shaft 4, as seen in Figure 3, is mounted at one end in the rear wall of the gear box and at its other end in the bracket 7 in the gear box.

The drive shaft 1 has a gear 8 thereon meshing with a gear 9 keyed to the countershaft 3. The transmission shaft has gears 11, 12 and 13 mounted thereon to rotate about the same and meshing respectively with gears 14, 15 and 16 on the countershaft. The gear 13 is the last gear in the first speed forward train and in the reverse train and is, for convenience, referred to herein as the final gear. It is common to the two trains of gears. The reverse shaft 4 has a spool comprising gears 17 and 18 mounted thereon and meshing respectively with the final gear 13 on the transmission shaft and with a clutch gear 27 on the countershaft when the latter is shifted forward or to the left in Figure 1, as will presently appear. The gears 11, 12 and 13 on the transmission shaft are mounted on suitable bearing surfaces, such as plain, interrupted metal bearing surfaces, such as plain, interrupted metal or anti-friction, and are normally rotatable about or relatively to the transmission shaft. They are connected thereto through shiftable clutch elements including synchronizers to be presently described.

The gear 16 on the countershaft is normally rotatable with the countershaft and is mounted thereon through a suitable bearing and is clutched thereto through shiftable elements to be presently described. The gear 16 is in the first speed forward train. The reverse spool having the gears 17, 18 is mounted on the shaft 4 through a suitable bearing. It is to be understood that plain bearings, such as shown on the reverse gear shaft may be utilized for gears 11, 12 and 13 and also that all of the gears may be mounted upon suitable anti-friction bearings or interrupted metal surfaces, if desired. The final gear 13 meshes with two gears 16, 17 forming respective gears in one forward drive train and the reverse drive train. The gears 16, 17 are alternately connectable in a drive relation through the shiftable elements to produce a forward speed or a reverse speed, and in either case, the clutch gear 27 serves to connect gear 16 or 17 to the countershaft to deliver power to said final gear 13 in a forward or reverse direction.

The reverse gear ratio through the train of gears 13, 17 and 18 of the reverse gear spool and the clutch gear 27 when in mesh with the gear 18, and the first speed forward ratio between the gears 13, 16 and clutch gear 27 acting as a clutch, is such that the clutch gear 27 and the reverse spool gear 18 have the same peripheral speed; hence immediately after the shifting of the clutch gear 27 out of clutching engagement with the gear 16, the clutch gear 27 and the gear 18 with which it is to be brought into mesh, have the same peripheral speed, because of the synchronizing action on the clutch 22 on the gear 13 and the gear ratios. As clearly illustrated in Figures 1 and 3 of the drawings, the two gears 16 and 17 are of the same diameter and their teeth are of the same size and number so that the gears 16 and 17 have the same peripheral speed.

19 designates generally a shiftable clutch element including a synchronizer, hereinafter described in detail. The element 19 is slidably connected, as through splines 20 on the transmission shaft, and is shiftable rearwardly or to the right (Figure 1) from neutral position to clutch the gear 11 to the transmission shaft, so that an indirect drive is established from the drive shaft 1 through gears 8, 9, 14 and 11. The element 19 is shiftable forwardly or to the left from neutral to clutch the drive shaft 1, and transmission shaft 2, directly together in direct drive relation. These two changes produce third and fourth speeds respectively.

22 designates a shiftable element or synchronizer, similar to element 19, which is shifted rearwardly, or to the right (Figure 1), from idle or neutral position to bring its teeth 23 into interlocking engagement with teeth 24 on the hub 25 of the final gear 13 common to the first forward and reverse drives to produce first speed forward from the drive shaft through gears 8, 9, countershaft 3, clutch gear 27, gear 16 and final gear 13, the final gear 16 being then clutched to the countershaft to be presently described. The shiftable element 22 is shiftable forwardly or to the left to interlock its teeth 23 with clutch teeth 26 on the gear 12, and thus lock the gear 12 to the transmission shaft 2 to produce second speed forward from the drive shaft through gears 8, 9, countershaft 3, and gears 15 and 12.

27 is a shiftable element or clutch gear or combined clutch and gear. It is slidably keyed to the countershaft 3 and normally arranged with its teeth 28 interlocked with teeth on the hub 29 of the gear 16 and shiftable forwardly or to the left to shift its teeth 28 out of interlocking engagement with the teeth of the hub 29, so that the gear 16 is then free to idle. When thus shifted, gear 27 meshes with gear 18 to drive the reverse spool, and therefore, the gear 17 of the spool drives the final gear 13 and the transmission shaft in a reverse direction.

The shifting mechanism is so arranged that this shifting operation of the element or clutch gear 27 to disconnect the gear 16 from the countershaft can be effected only when the shiftable element or clutch 22 has been shifted from neutral rearwardly to clutch the final gear 13 to the transmission shaft, and hence, so that the final gear 13 on the transmission shaft is never subject to two different drives through the gears 16 and 17.

The gear shifting mechanism is of the selective type including a finger having a lateral or axial selecting movement and a fore and aft shifting movement, the finger being preferably integral with a shift lever, which lever is shiftable laterally about a fulcrum in the top of the tower T and also has a fore and aft rocking movement in the usual manner.

In the illustrated embodiment of my invention, the high speed shiftable clutch element 19 is shifted by the lever 33 having a suitably formed finger portion 34 coacting with a block or slide 35 on a shift rod 36, which block has a fork 37 coacting with a groove in the shifter collar 39 of the clutch element 19.

The selecting and shifting mechanism for the shiftable elements or clutches 22 and 27 comprises shifters or blocks 42 and 43 mounted on shift rods 44 and 45 suitably mounted in the cover 6, and connected through forks 46 and 47 respectively to the shiftable elements or clutches 22 and 27. The shifter or block 43 is shiftable to establish reverse speed drive only when the block 42 is shifted to establish first speed drive. The lever 33 is shiftable laterally to have a selecting movement for engagement with either of blocks 42 or 43, and has a fore and aft shifting movement during the rocking of the lever to shift the selected shifters or blocks 42, 43.

The shiftable clutch element 19, in addition to being provided with an annular shiftable toothed section or portion 49 having internal splines or teeth 20, is formed with spaced annular series of clutch teeth 50 and 51, engageable respectively with teeth 52 and 53 provided interiorly of annular projections on gears 8 and 11. The outer surfaces or projections are bevelled or tapered, as at 56 and 57, to provide friction clutch surfaces, which are engageable by annular friction clutch rings 60 and 61 carried interiorly of the opposite ends of a friction section 63 in the general form of a sleeve. Projecting from the section 49 are a plurality of radial posts or bosses 64, 64ª extending radially therefrom, the outer ends of which support the sleeve 63. The section 49 is operatively connected to the sleeve section 63 through the medium of spring-pressed poppets or balls 65 arranged in bores 66 in the posts or bosses 64, which alternate with the posts or bosses 64ª, the balls normally seating in recesses 67 in the sleeve, when the clutch 19 is in neutral position. The section 49 is also connected to the collar 39 through pins 68 freely received in recesses or bores 69 in the posts or bosses 64ª and projecting through cam slots 70 in the sleeve section 63 and also freely received in bores or recesses 71 in the shifting collar 39. The shifting collar 39 encircles the outer surface of the sleeve section 63 and slidably fits the same. The collar 39 is provided with a shifter groove 72 for the reception of the shifter fork yoke 37 actuated by the shifter rod by means of the shifting lever 33. The pins 68 serve as the connecting means between the collar 39 and the toothed section 49 to transmit the shifting movement of the collar to the toothed section 49.

This construction or assembly of the toothed and friction sections by means of pins slidably received in bores in the toothed section and in the shifting collar provides a particularly simple, economical and compact construction, which is readily assembled. Also, owing to the pins being so slidably received, any binding is eliminated or avoided that would otherwise occur on account of the rigidity between the shiftable collar slidable on the sleeve section and the toothed section slidable in the sleeve section. The sleeve section is supported on the end faces of the bosses or posts 64 at all times and also on the end faces of the posts or bosses 64ª, except when the clutch is in neutral position. The posts or bosses 64 constitute one set in which the means or spring-pressed balls 65 are located for yieldingly transmitting the motion of the collar 39 and section 49 to the friction or sleeve section 63. The spring-pressed balls permit the section 49 to be shifted relative to the friction or sleeve section 63, when the sleeve section 63 is restrained by reason of one or the other of its friction faces engaging the friction face of the gear 8 or 11.

The slots 70 are of the form illustrated particularly in Figure 2, and each comprises a longitudinal slot portion 75 and two oppositely disposed lateral recesses 76 on opposite sides of the slot 75, substantially centrally thereof, for receiving its cooperating pins 68. The slots 75 extend lengthwise of the sleeve section 63 and terminate short of the ends thereof, and the lateral recesses 76 are located intermediate of the ends of the slots and constitute wider or entrance portions for the pins 68 into either of the end portions of the slots 75. The pins 68 are substantially the same diameter as the widths of the slots 75 and of less diameter than that of the oppositely disposed recesses 76. The recesses permit relative rotative movement, within limits, of the section 49 relative to the friction section 63, to cause the pins to enter into one or the other of the recesses 76, and thus block further shifting of the section 49, until the speeds are synchronized through the friction section. When, due to the synchronization, the pins do not press against the walls of these wider portions 68, the section 49 can be shifted to engage the clutch teeth 50 or 51 with the clutch teeth 52 or 53, because the pins, during this engagement of the clutch teeth, are not held from passing into one or the other of the narrower end portions of the slots 75. The posts 68 are circular in cross-section and the recesses 76 are also preferably arcuate but the depth thereof may be varied to suit the conditions of the gearing in which the clutch is installed. Owing to the slots 75, recesses 76 and the circular posts 68, the shifting of the toothed section is blocked before the speeds are synchronized and the posts 68 readily disengage from the recesses 76 and pass into the slots 75, when the speeds are synchronized.

The clutch element 22 is substantially similar to the element 19, except that the sleeve 82 is tapered at 83 and 84 for engagement with annular friction rings 85 and 86 which are carried in annular recessed portions 87 and 88 of gears 12 and 13, when the sleeve is shifted through a shifter collar 89.

The clutch elements 19 and 22 serve to synchronize their toothed clutch portions with the speed of the transmission gears through the medium of their friction clutch or sleeve sections, as hereinafter described, the pin-and-slot connections between the portion 49 and sleeve section 63 permitting relative movement therebetween to compensate for improper or premature engagement of the teeth.

From the foregoing, it will be clear that the method of assembly of the present clutch element is very much simplified over prior constructions. The pins 68, being freely received within the bores 69, are insertable therein after the sleeve 63 and the collar 39 are assembled with splined member 49. Thereafter, when the synchronizer is positioned on its corresponding shaft, a positive driving connection is established between the shaft and the collar 39, the connection, however, being arranged to have a certain amount of relative movement between the member 49 and the sleeve 63 through the cam slots 70 so that operation of the friction sleeves or synchronizers is effected in the following manner.

In Figures 1 and 6, the parts are in their starting, idle or neutral positions. It will be seen that the clutch 27 is coupled to the gear 16 through the teeth 29, so that the shaft 3 is out of mesh with the gear 18 on the reverse spool. To produce first speed forward, the hand lever 33 is moved to the left and forwardly, thus causing the finger 34 to move rearwardly carrying the first speed shifter or block 42 rearwardly and shifting the clutch element 22 to carry its teeth into interlocking engagement with the teeth of the final gear 13, thus locking the gear 13 to the transmission shaft, so that the transmission shaft is actuated from the drive shaft 1 through the gears 8, 9, 16 and 13. At this time, the combined clutch and gear 27 on the countershaft is in its normal position in which the gear 16 is clutched thereby to the countershaft.

Shifting of the first speed shifter block 42 to its operative position brings its notch 90 into alinement with the notch 91 of the reverse shifter block 43. To produce a reverse speed, the lever 33 of the selecting and shifting mechanism is shifted against a spring 92 carrying the finger 34 into the notch 91 and out of the notch 90. Now, upon rearward movement of the hand lever 33, the finger 34 is rocked forwardly, thus carrying the reverse shifting block 43 forward and leaving the clutch 22 in its operative position in which the final gear 13 is clutched to the transmission shaft and shifting the combined clutch and gear 27 forwardly to engage its gear teeth with the teeth of the gear 18 on the reverse gear spool so that the gear 17 of the spool on the shaft 4 rotates the final gear 13. Hence, now reverse speed is established from the drive shaft 1, through gears 8, 9, countershaft 3, gear 27 thereon and gears 18 and 17 on the reverse shaft 4 and gear 13 on the transmission shaft. The shifter block 42 is connected to the clutch 22 through the fork 46 and the reverse shifter block 43 is connected through a suitable double fork 47 with the shiftable element or clutch 27.

The finger 34 of the selecting and shifting mechanism is shifted laterally to select the reverse shifter block 43 against the reaction of the spring 92. When shifting to produce reverse, the finger 34 is moved against the action of the spring 92. However, such shifting of the finger is prevented until the lever 33 is rocked to shift the first speed forward block 42 to carry the clutch or shiftable element 22 into its operative position, clutching the final gear 13 to the transmission shaft, and thus bringing its notch 90 into alinement with the notch 91 of the reverse shifter or block 43. When the notch 90 does come into alinement with and into the notch 91, the finger 34 can be rocked rearwardly by the hand lever 33, thus moving the finger 34 forwardly, shifting the clutch 27. During this shifting of the shifter block 43, the finger 34 is prevented from re-entering the notch 90 and the rod 44 is held under the re-action of the springs 92, by the fact that the notch 91 has moved out of alinement with the notch 90. To shift from reverse speed, the hand lever 33 is pushed forwardly, rocking the finger 34, causing the block 43 to move rearwardly, shifting the combined clutch and gear 27 back to normal position and bringing the notch 91 of the reverse shifter 43 into alinement with the notch 90 of the first speed forward shifter 42. Now, the spring 92 re-acts and immediately carries the finger 34 into the notch 90 of the first speed forward shifter block 42, from which position, it can be shifted back to neutral and into the second speed forward. Obviously, alternate rocking of the finger 34 by the lever 33 in opposite directions will alternately engage first and second speeds forward.

To shift from first to second speed forward, for example, shaft 2 being driven by gear 13, due to the engagement therebetween of the clutch 22, the clutch 22 is shifted forwardly to connect the gear 12 to the shaft 2. During shifting, the pins 68 move from one end of the slot 70 to the other end thereof, but due to the fact that there may be a period in which the sleeve and the shaft are rotating at different speeds, the pin 68 may become engaged in the lateral recesses 72 to provide synchronization therebetween. During further movement, the pins 68 urge the sleeve toward the gear 12 being clutch to the shaft 2, and upon synchronization between the friction faces, the pins 68 may gear through the friction faces, the pins 68 may move into the end 75 of the slot, and permit engagement of the clutch teeth, and thus shaft 2 is connected to and driven by the gear 12.

There is a suitable interlock between the shift rods 36, 44 and 45, so that only one may be operated, when the others are in neutral position. The form of interlock illustrated comprises a pair of bearing balls 94 arranged between adjacent rods alternately engageable in notches 95 provided in the sides of the rods, and being of a diameter to permit one rod to be moved when one of the balls 94 is in engagement with a notch 95 of the adjacent rod which is thereby maintained in fixed position.

Thus, a single shifting lever 33 is utilized to select and shift the block 35 which operates the element or clutch 19 to produce direct drive or fourth speed forward, and third speed forward, to select and shift the block 42 which operates the synchronizing clutch 22 to produce first and second speed forward, to select and shift the block 43 to effect reverse, in conjunction with this block 42 when shifted to one forward position, as first speed forward and when this block 43 is operated to produce reverse speed in conjunction with the block 42, the forward speed, that is first speed forward, is cut out. As the final gear 13 on the transmission shaft is connected to the transmission shaft through the synchronizing clutch 22, and as it also is the final gear of the train of gears producing first speed forward and reverse speed, the reverse speed spool is synchronized when the combined clutch and gear 27 is shifted to mesh with the gear 18 of the reverse spool. Hence, the synchronizing clutch 22 synchronizes both the differential speeds of the transmission shaft 2 and gear 13 during the shift into first speed forward, and at the same time, synchronizes the gears 27 and 18, should a shift be made from first speed forward into reverse, this being due to the fact that the final gear 13, which is common to the first speed forward train of gears and the reverse train of gears, meshes at all times with the gears 16 and 17 and the combined clutch and gear 27 is normally clutched to, and rotating at the same speed, as the gear 16 and also at the same speed as the gear 18 into mesh with which it is shifted for reverse speed.

It will be understood that during gear shifts, the main clutch of the vehicle is thrown out in the usual manner.

What I claim is:

1. In a change-speed transmission gearing including a gear box, drive, transmission and countershafts, trains of all-in-mesh gears between the shafts to produce a plurality of speeds forward, one of the gears of said forward speed train being rotatable about the transmission shaft and another gear rotatable about the countershaft, the combination of reverse gearing including a double gear or spool, one gear of which meshes with said gear on the transmission shaft, and a unitary gear and clutch on the countershaft normally clutching the gear of the forward train to the countershaft and shiftable to unclutch it, and at the same time shiftable into mesh with the other gear of the spool, a synchronizing clutch operable to clutch the gear of the forward train on the transmission shaft to the same, and means for selecting and shifting said synchronizing clutch and unitary gear and clutch successively including mechanism for shifting the unitary clutch and gear out of its normal position only after the synchronizing clutch has been shifted to clutch the gear of the forward train to the transmission shaft.

2. In a change-speed transmission gearing including a gear box, drive, transmission and countershafts, trains of all-in-mesh gears between the shafts to produce a plurality of speeds forward, the combination of a reverse gear including a spool, one gear of which is in mesh with one of the gears of one of the forward trains, so that the spool normally idles with said train, a unit including a gear on the countershaft shiftable into and out of mesh with the other gear of the spool and normally out of mesh therewith and a clutch unitary with the last gear and normally clutching another gear in said forward train to the countershaft and shiftable to unclutched position when the gear of said unit is shifted into mesh with the companion gear of the spool, shiftable clutches embodying synchronizers operable to selectively clutch a certain gear on each train to the shaft on which the gear is mounted, and means for selecting and shifting the clutches and for selecting and shifting the unit into engagement with the reverse spool only when a certain synchronizing clutch has been operated to connect the gear in the forward train with which the unit meshes.

3. In a change-speed transmission gearing including a gear box, drive, transmission and countershafts, trains of all-in-mesh gears between the shafts to produce a plurality of speeds forward, the combination of a reverse gear including a spool, one gear of which is in mesh with one of the gears of one of the forward trains, so that the spool normally idles with said train, a unit including a gear on the countershaft shiftable into and out of mesh with the other gear of the spool and normally out of mesh therewith, and a clutch unitary with the last gear and normally clutching another gear in said forward train to the countershaft and shiftable to unclutched position when the gear of said unit is shifted into mesh with the companion gear of the spool, shiftable clutches embodying synchronizers operable to selectively clutch a certain gear on each train to the shaft on which the gear is mounted, and means for selecting and shifting the clutches and said unit, including mechanism for shifting and selecting said unit only when one of said synchronizing clutches has been first operated to clutch the gear of said forward train to its shaft.

4. In a transmission gearing embodying a gear box, driving, driven and countershafts, and trains of all-in-mesh gears between the shafts to produce a plurality of speeds forward and a reverse gear train, the reverse gear train including a spool having one of its gears in mesh with one of the gears of said forward gear train, and normally idling therewith, and another gear rotatable with the countershaft and having means for normally clutching a gear of said forward train to the countershaft and shiftable to unclutch the same and into mesh with the other gear of the spool, clutches selectively operable for clutching gears of the forward trains to the shafts on which they are mounted, one of said clutches including a synchronizer and operable to clutch one of the gears of said forward train to its shaft and thereby synchronizing the speeds of the reverse gear spool with the reverse gear on the countershaft, and means for selectively shifting said clutches and said reverse gear on the countershaft including mechanism for shifting the gear on the countershaft only when the gear of said forward train has been clutched to its shaft through its synchronizing clutch.

5. In a change-speed transmission gearing including drive and transmission shafts, a countershaft, and a reverse shaft, trains of gears between the shafts to produce a plurality of forward speeds and reverse, including a final gear on the transmission shaft in a forward gear train and in the reverse gear train, normally rotatable about the same and common to a forward speed and reverse speed, and normally in mesh with a gear on the countershaft in said forward gear train and with one gear of a reverse gear spool on the reverse shaft, a shiftable clutch element, including synchronizing means, on the transmission shaft operable to connect said final gear to the transmission shaft, a second shiftable element on the countershaft, including a toothed clutch and a gear, the toothed clutch being normally in position to clutch the said gear on the countershaft to the same and shiftable into position to carry its gear into mesh with the other gear of the reverse gear spool, and means for selecting and shifting the synchronizing clutch elements and the shiftable clutch and gear element on the countershaft and operable to shift the clutch and gear element into mesh with the reverse spool only after the gear on the transmission shaft in one of the forward gear trains has been clutched, through the synchronizing clutch, to the transmission shaft and the companion gear meshing therewith unclutched from the countershaft.

6. In a change-speed transmission gearing including drive and transmission shafts, a countershaft, and a reverse shaft, trains of gears between the shafts to produce a plurality of forward speeds and reverse, including a final gear on the transmission shaft in a forward gear train and in the reverse gear train, normally rotatable about the same and common to said forward speed and reverse speed, and normally in mesh with a gear on the countershaft in said forward gear train and with one gear of a reverse gear spool in the reverse shaft, a shiftable clutch element, including synchronizing means, on the transmission shaft operable to connect said final gear to the transmission shaft, a second shiftable element on the countershaft, including a toothed clutch and a gear, the toothed clutch being normally in position to clutch said gear on the countershaft to said shaft, and shiftable into position to carry its gear into mesh with the other gear of the reverse gear spool, whereby the reverse gear spool and the gear of the second shiftable element are synchronized, when the final gear on the transmission shaft is clutched to the transmission shaft, and means for selecting and shifting said elements, said means comprising mechanism for shifting the second shiftable element out of its normal position only when the first shiftable element has been shifted to clutch the final gear to the transmission shaft.

7. In a change-speed transmission gearing including drive and transmission shafts, a countershaft, and a reverse shaft, trains of gears between the shafts to produce a plurality of forward speeds and reverse, including a final gear on the transmission shaft in a forward gear train and in the reverse gear train, normally rotatable about the same and common to said forward speed and reverse speed, and normally in mesh with a gear on the countershaft in said forward gear train and with one gear of a reverse gear spool in the reverse shaft, a shiftable clutch element, including synchronizing means, on the transmission shaft operable to connect said final gear to the transmission shaft, a second shiftable element on the countershaft, including a toothed clutch and a gear, the toothed clutch being normally in position to clutch said gear on the countershaft to said shaft, and shiftable into position to carry its gear into mesh with the other gear of the reverse gear spool, whereby the reverse gear spool and the gear of the second shiftable element are synchronized when the final gear on the transmission shaft is clutched to the transmission shaft, and means for selecting and shifting said elements, said means including a single selecting and shifting lever and shifter blocks with which the lever cooperates, for said shiftable elements respectively, and said shifter blocks being so arranged relative to each other that the shifter block for the second shiftable element is selectable only when the block for the first shiftable element is in its position occupied when said final gear is clutched to the transmission shaft and so that the shifter block for the first shiftable element can be selected only when the shifter block for the second shiftable element has been shifted back to its starting position.

8. In a selective change-speed transmission gearing including drive and transmission shafts, a countershaft, and a reverse gear spool, trains of gears between the drive and transmission shafts including a gear on the transmission shaft, and a gear on the countershaft in mesh with the gear on the transmission shaft and also including one of the gears of the reverse spool in mesh with the gear on the transmission shaft, a shiftable clutch element on the transmission shaft including synchronizing means movable to connect said gear on the transmission shaft to the transmission shaft and to disconnect it therefrom, a second shiftable element on the countershaft including a clutch and a gear and normally arranged to clutch the gear on the countershaft to said countershaft and shiftable into unclutching position to shift its gear into mesh with the other gear of the spool, and mechanism for selecting and shifting the shiftable elements including means for selecting and shifting of the second shiftable element out of its normal position only when the first shiftable element is in its position assumed when the transmission shaft gear is clutched to the transmission shaft.

9. In a selective change-speed transmission gearing including drive and transmission shafts, a countershaft, and a reverse gear spool, trains of gears between the drive and transmission shafts shiftable elements operable to select trains of gears to produce a plurality of speeds forward through indirect drives and a forward speed in direct drive, said trains of gears including a final gear on the transmission shaft common to a forward speed and reverse speed, and a gear on the countershaft in mesh with said final gear, and also including one of the gears of the reverse gear spool in mesh with said final gear, one of said shiftable elements, including synchronizers, and being movable in opposite directions from neutral to connect said final gear to the transmission shaft and connect another gear on the transmission shaft in another train, to the transmission shaft, the second of said shiftable elements being on the countershaft and including a combined toothed clutch and gear, and normally clutching the gear on the countershaft in mesh with said final gear to the countershaft and shiftable out of such position and into position to shift its gear into mesh with the reverse gear spool, a third shiftable clutch element including synchronizers operable in opposite directions from neutral to connect the drive and transmission shafts in direct drive relation, and to clutch the gear in another forward train to the transmission shaft, selecting and shifting mechanism including shifter blocks connected respectively to the shiftable elements, and a selecting and gear shifting lever having a lateral selecting and a fore and aft shifting movement, the shifter blocks for the first and third shiftable elements having notches normally arranged in alignment, and the shifter block for the second shiftable element being out of alinement with the former notches, and the notch of the first shiftable element being movable into alinement with the notch of the second shiftable element, when the first shiftable element is shifted to clutch said final gear on the transmission shaft to said shaft, whereby the lever may be operated out of the notch of the block of the first shiftable element into the notch of the block of the second shiftable element to operate the second shiftable element and move the notch of its shifting block out of alinement with the notch of the first shiftable element.

10. In a change-speed transmission gearing embodying the usual drive, driven and countershafts, and a plurality of selectable forward trains of inmesh gears between said shafts, and a reverse train, one forward train including a final gear normally rotatable about the driven shaft, and a gear on the countershaft meshing therewith, a synchronizing clutch operable to connect the final gear to the driven shaft, the reverse train including a reverse gear spool having one gear meshing with the final gear and a reverse gear on the countershaft shiftable into and out of mesh with the other gear of the spool and normally out of mesh therewith, means for shifting the last gear only when the final gear has been clutched to the shaft by its synchronizing clutch, and for rendering the gear on the countershaft of the forward train ineffective to transmit motion when the reverse gear on the countershaft is connected to the reverse spool.

11. In a change-speed transmission gearing including input, output and countershafts, gears on the countershaft permanently meshing with gears on the input and output shafts, the gears on the output shaft being rotatably mounted thereon, and selectively shiftable synchronizing clutches operable from neutral to selectively clutch gears on the output shaft thereto, one of the gears on the countershaft being mounted thereon to rotate relatively to the same, a reverse gear spool meshing with one of said gears on the output shaft, and a clutch gear rotatable with the countershaft and shiftable axially in one direction to clutch the rotatably mounted gear on the countershaft thereto, and in the other direction into mesh with the reverse spool, and mechanism for selectively shifting the synchronizing clutches and the clutch gear including means for clutching to the output shaft, the gear on the same which meshes with the rotatable gear on the countershaft, preliminary to shifting the clutch gear into mesh with the reverse gear spool.

12. In a change-speed transmission gearing including input, output and countershafts, gears on the countershaft permanently meshing with gears on the input and output shafts, the gears on the output shaft being rotatably mounted thereon and selectively shiftable synchronizing clutches operable from neutral to selectively clutch the gears on the output shaft thereto, one of the gears on the countershaft being mounted thereon to rotate relatively to the same, a reverse gear spool meshing with one of said gears on the output shaft, and a clutch gear rotatable with the countershaft and shiftable axially in one direction to clutch the rotatably mounted gear on the countershaft thereto, and in the other direction into mesh with the reverse spool, and mechanism for selecting and shifting the synchronizing clutches and the clutch gear including means operable to successively operate one of the synchronizing clutches to clutch to the output shaft the gear thereon which meshes with the rotatable gear on the countershaft and operate the clutch gear to unclutch the gear on the countershaft and shift the clutch gear into mesh with the reverse spool.

13. In a change-speed transmission gearing including input, output and countershafts, and gears on the countershaft permanently meshing with gears on the input and output shafts, the gears on the output shaft being rotatably mounted thereon, and selectively shiftable synchronizing clutches operable to selectively clutch gears on the output shaft thereto, one of said trains of gears including a final gear on the output shaft and a gear on the countershaft normally rotatable about the same, a reverse gear spool meshing with one of the gears on the output shaft and a clutch gear rotatable with the countershaft and shiftable in one direction to clutch the rotatable gear on the countershaft thereto and in the other direction into mesh with the reverse gear spool, and mechanism operable to successively operate the synchronizing clutch which connects the said final gear to the output shaft, and the clutch gear into mesh with the reverse gear spool.

CARL D. PETERSON.